United States Patent [19]

Hollis et al.

[11] Patent Number: 5,023,319
[45] Date of Patent: Jun. 11, 1991

[54] STABILIZATION OF MODIFIED ROSIN

[75] Inventors: Samuel D. Hollis; Robert W. Johnson, Jr., both of Savannah, Ga.

[73] Assignee: Union Camp Corporation, Wayne, N.J.

[21] Appl. No.: 132,301

[22] Filed: Dec. 15, 1987

[51] Int. Cl.$^5$ ............................................. C08L 93/04
[52] U.S. Cl. ................................... 530/212; 530/219; 530/220
[58] Field of Search ..................... 260/97.5, 106, 107; 530/212, 219, 220

[56] References Cited

U.S. PATENT DOCUMENTS

| | | | |
|---|---|---|---|
| 2,407,248 | 6/1942 | Borglin | 260/106 |
| 2,497,882 | 2/1950 | Hampton | 260/105 |
| 2,503,268 | 4/1950 | Hasselstrom et al. | 260/106 |
| 3,377,334 | 4/1968 | McBride et al. | 260/106 |
| 3,649,612 | 3/1972 | Scharrer | 260/98 |
| 3,980,630 | 9/1976 | Ishigami et al. | 260/106 |
| 4,265,807 | 5/1981 | Breslow | 260/97.5 |
| 4,302,371 | 11/1981 | Matsuo et al. | 260/106 |
| 4,339,377 | 7/1982 | Hollis | 260/106 |
| 4,481,145 | 11/1984 | Timms | 260/97.5 |

OTHER PUBLICATIONS

Sinclair and Berry, "Influence of Reaction Conditions on the Dimerization of Abietic Acid and Rosin", *I&EC Product Research and Development*, vol. 9, pp. 60–65 (Mar. 1970).
Kirk Othmer's Encyclopedia of Chemical Technology, (2nd Rev. Ed., 1968), vol. 17, pp. 494–498.
Practical Organic Chemistry, ed., A. I. Vogel, 3rd Ed., (John Wiley & Sons, Inc. 1956).

*Primary Examiner*—John Kight, III
*Assistant Examiner*—Dennis R. Daley
*Attorney, Agent, or Firm*—Edward J. Sites

[57] ABSTRACT

This invention relates to a method for treating polymerized rosin to decrease its tendency to oxidize comprising heating the polymerized rosin to an elevated temperature in the presence of an effective amount of one or more disproportionating agents. This invention also relates to the novel products of such disproportionation treatments.

7 Claims, No Drawings

STABILIZATION OF MODIFIED ROSIN

This invention relates to methods of stabilizing modified rosin. More specifically, this invention relates to methods for stabilizing rosin which has previously been polymerized.

It is well known that rosin exists in a number of forms. The term rosin, as used herein, includes tall oil rosin, wood rosin, gum rosin, crude materials and mixtures containing any of the foregoing, and, in general, any materials containing abietic acid, including tall oil fractions containing various proportions of rosin and fatty acids.

Rosin is commercially available in polymerized forms. The polymerization of rosin involves dimerization of constituent rosin acids, such as abietic and isopimaric acids, and other rosin acids which are their double bond isomers, and is described in Berry and Lawrence, "Influence of Reaction Conditions on the Dimerization of Abietic Acid and Rosin," *I&EC Product Research and Development,* Vol. 9, page 60, March 1970, the disclosure of which is hereby incorporated by reference. Advantages of polymerized rosins compared to unmodified rosins are their relatively higher melting points and their relatively lower tendencies to crystallize or oxidize. Commercially available polymerized rosin is supplied as a mixture of the polymerized with the non-polymerized rosin or as a purified polymeric rosin from which the monomeric rosin has been partially removed, usually by distillation. In either case, the resultant product usually has a ring and ball softening point of 90 degrees C., or over such that it can be supplied and conveniently used as a non-remassing flake. Unfortunately, the flaked form is susceptible to oxidation to such an extent that it usually has a storage life of not more than a few months after which it becomes so oxidized that it does not perform correctly in many formulated or processed products. Oxidized polymer-rosin will darken excessively if used as a component in an alkyd cook where it is to be esterified with polyols. It will also precipitate out, or cause excessive haze and other defects, when it is merely blended in as a physical mixture in solvent born or hot melt adhesives.

To stabilize untreated rosin against oxidation, it is known to convert most of the conjugated rosin acids, as typified by abietic acid, to an isomer without conjugated double bonds such as, for example, dehydroabietic acid. This stabilization is commonly done by "disproportionation," a term used in the art to describe displacement of hydrogen atoms in the abietic acid molecule. Rosin can be disproportionated by heating it at elevated temperature in the presence of catalysts. Despite many disclosures relating to the disproportionating of rosin, Applicant is aware of no references relating to the disproportionation of polymerized rosin.

SUMMARY OF THE INVENTION

It has now been found that the tendency of polymerized rosin to oxidize can be substantially reduced by post-treating the polymerized rosins with an effective amount of disproportionation catalyst. This invention therefore relates to a method for treating polymerized rosin to decrease its tendency to oxidize comprising heating said rosin to an elevated temperature in the presence of an effective amount of one or more disproportionating agents. This invention also relates to the novel products of such disproportionation treatments.

DETAILED DESCRIPTION OF THE INVENTION

Polymerized rosin treated according to this invention by contacting it at elevated temperatures with an effective amount of one or more disproportionating agents. A wide variety of disproportionation catalysts are known. U.S. Pat. No. 3,277,072 teaches the use of iodine, while others (U.S. Pats. No. 2,130,997, 2,239,555, 2,138,183, 2,154,629, 2,486,183, and 2,580,496) teach the use of noble metals such as platinum or palladium. The use of sulfur or selenium is suggested in U.S. Pat. No. 2,503,268 and U.S. Pat. No. 2,497,882. U.S. Pat. No. 3,377,334 teach a combination of disproportionation and bleaching by use of hydroxylated arylsulfides, and U.S. Pat. No. 3,649,612 teaches a similar process using aryl thiols. U.S. Pat. No. 4,265,807 discloses a method of disproportionating rosin using a dithiin derivative. Any of the known disproportionating agents may be used, and the disclosures of all of the above-mentioned patents are hereby incorporated by reference. Examples of preferred disproportionating agents include iodine, amylphenol disulphide, selenium, 1,1,-thiobis-(2-naphthol),and 2,4-dihydroxythiophenol. Disproportionation is a catalytic reaction, and only catalytic quantities of the disproportionating agents are therefore required.

The polymerized rosin is contacted with the disproportionating agent at a temperature and for a time sufficient to convert most of the conjugated rosin acids, as typified by abietic acid, to an isomer without conjugated double bonds. The exact conditions for disproportionating will vary depending on the starting rosin material. Generally, however, treatment with a disproportionating agent at a temperature within the range of about 200° to 300 degrees C. for about one to four hours will suffice. It is desired that the resulting modified rosin have an abietic acid content of less than about 5.0%, preferably less than about 1.0% by weight. Another way of measuring the structural rearrangement of the rosin is by its ability to absorb oxygen. Preferably, the modified rosin according to this invention, when placed in a pure oxygen atmosphere of 300 psi for fourteen days at 25 degrees C., will absorb no more than about 0.4% by weight oxygen.

EXAMPLES 1, 2 and 3

Commercial polymerized rosin which has been stripped to 140 degrees C. ring and ball softening point was melted under inert gas and then heated to 280 degrees C. after adding 0.2% of the disproportionating agents listed in the table below. The batches were held for two hours, then cooled and discharged into pans. One gram samples of the modified rosin polymers were placed in a pure oxygen atmosphere of 300 psi for fourteen days at 25 degrees C., then re-weighed for weight gain. The increase in weight observed (oxygen absorption) in this test is enumerated in the table below along with the observed color of the treated rosin polymer after the treatment measured using the Gardner Test (ASTM Method D1554). Example 1 is a comparative example which was given no treatment.

|  | Example | | |
| --- | --- | --- | --- |
|  | 1 | 2 | 3 |
| Polymerized Rosin (pbw) | 100 | 100 | 100 |
| Amylphenol Disulphide (pbw) | — | 0.2 | — |
| Iodine (pbw) | — | — | 0.2 |

-continued

|  | Example | | |
|---|---|---|---|
|  | 1 | 2 | 3 |
| Color 50% in Toluene (Gardner) | 11 | 8 | 7 |
| Oxygen Absorption (%) | 0.7 | 0.2 | less than 0.3 |

What is claimed is:

1. A method for treating polymerized rosin to decrease its tendency to oxidize comprising heating said rosin to an elevated temperature in the presence of a catalytic amount of one or more disproportionating catalysts selected from the group consisting of iodine, noble metals, hydroxylated arylsulfides, aryl thiols, or dithiin derivatives.

2. The method of claim 1 where said disproportionating catalyst is selected from the group consisting of iodine, amylphenol disulphide, 1,1-thiobis-(2-naphthol), or 2,4-dihydroxythiophenol.

3. The method of claim 1 where said rosin and said disproportionating agent are heated for a period of about one to four hours.

4. The method of claim 1 where said elevated temperature is within the range of about 200 to 300 degrees C.

5. The product prepared by the process of claim 1.

6. A polymerized rosin which, when placed in a pure oxygen atmosphere of 300 psi for fourteen days at 25 degrees C., absorbs no more than about 0.4% by weight oxygen.

7. The rosin of claim 6 which has an abietic acid content less than about 1.0% by weight.

* * * * *